United States Patent
Wang et al.

(10) Patent No.: US 10,298,373 B2
(45) Date of Patent: *May 21, 2019

(54) METHOD AND ARRANGEMENT FOR PILOT PATTERN BASED CONTROL SIGNALING IN MIMO SYSTEMS

(71) Applicant: TELEFONAKTIEBOLAGET L M ERICSSON (PUBL), Stockholm (SE)

(72) Inventors: Yi-Pin Eric Wang, Fremont, CA (US); Jung-Fu Cheng, Fremont, CA (US); Stephen Grant, Pleasanton, CA (US); Karl J. Molnar, Cary, NC (US); Leonid Krasny, Cary, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 107 days.

This patent is subject to a terminal disclaimer.

(21) Appl. No.: 15/711,007

(22) Filed: Sep. 21, 2017

(65) Prior Publication Data

US 2018/0026761 A1 Jan. 25, 2018

Related U.S. Application Data

(63) Continuation of application No. 14/549,304, filed on Nov. 20, 2014, now Pat. No. 9,813,211, which is a
(Continued)

(51) Int. Cl.
*H04B 7/06* (2006.01)
*H04L 1/00* (2006.01)
(Continued)

(52) U.S. Cl.
CPC .......... *H04L 5/005* (2013.01); *H04B 7/0417* (2013.01); *H04B 7/0632* (2013.01);
(Continued)

(58) Field of Classification Search
CPC ..... H04L 1/0003; H04L 1/0009; H04L 1/015; H04L 1/0026; H04L 1/0618;
(Continued)

(56) References Cited

U.S. PATENT DOCUMENTS

| 6,038,263 A * | 3/2000 | Kotzin .................. H04B 1/707 |
| | | 375/299 |
| 6,285,663 B1 | 9/2001 | Esmailzadeh |

(Continued)

FOREIGN PATENT DOCUMENTS

| CN | 101026764 A | 8/2007 |
| CN | 101223720 A | 7/2008 |
| EP | 1204282 A1 | 5/2002 |

OTHER PUBLICATIONS

Wang, et al., CDMA Downlink System Capacity Enhancement through Generatlized RAKE Reception. Vehicular Technology Conference, 2001. VTC 2001 Fall. IEEE VTS 54th, vol. 2, no., pp. 1177-1181 vol. 2, Sep. 2001.
(Continued)

*Primary Examiner* — Young T Tse

(57) ABSTRACT

A radio base station, user equipment (UE), and method of control signaling in wireless communication systems. Control information is transferred from a base station to at least one UE, via a plurality of common pilot channels. A set of unique pilot sequences is predefined, and the base station assigns specific pilot sequences from the set of pilot sequences to specific common pilot channels, forming a pilot sequence assignment pattern representing specific control information. The UE, having knowledge of the relations between pilot sequence assignment patterns and control information, interprets the received pilot sequence assignment pattern as specific control information. The method is particularly well suited for broadcast type control information.

17 Claims, 6 Drawing Sheets

Related U.S. Application Data continuation of application No. 12/514,762, filed as application No. PCT/SE2006/050469 on Nov. 13, 2006, now Pat. No. 8,923,423.

(51) Int. Cl.
  *H04L 5/00* (2006.01)
  *H04J 13/00* (2011.01)
  *H04B 7/0417* (2017.01)
  *H04L 1/06* (2006.01)

(52) U.S. Cl.
  CPC ........ *H04J 13/0003* (2013.01); *H04L 1/0015* (2013.01); *H04L 1/0026* (2013.01); *H04B 7/0684* (2013.01); *H04B 2201/70701* (2013.01); *H04L 1/0003* (2013.01); *H04L 1/0009* (2013.01); *H04L 1/0618* (2013.01); *H04L 2001/0093* (2013.01)

(58) Field of Classification Search
  CPC ............... H04L 5/0048; H04L 5/005; H04L 2001/0093; H04B 7/0404; H04B 7/0413; H04B 7/0632; H04B 7/0684; H04B 2201/70701; H04J 13/0008
  USPC ....... 375/259, 260, 262, 265, 267, 295, 299, 375/316, 346, 347; 370/203, 204, 208, 370/210, 277, 281, 295, 302, 310, 343, 370/380, 381; 455/39, 69, 73, 500, 509, 455/511, 515
  See application file for complete search history.

(56) References Cited

U.S. PATENT DOCUMENTS

| | | | |
|---|---|---|---|
| 7,085,559 B2 | 8/2006 | Sato et al. | |
| 7,218,617 B1 * | 5/2007 | Usuda | H04W 16/00 370/208 |
| 7,535,867 B1 | 5/2009 | Kilfoyle | |
| 7,653,140 B2 * | 1/2010 | Pajukoski | H04B 1/7103 375/260 |
| 7,688,926 B2 | 3/2010 | Suh | |
| 7,751,304 B2 * | 7/2010 | Ro | H04B 1/69 370/203 |
| 7,983,236 B2 * | 7/2011 | Rinne | H04B 7/0669 370/342 |
| 2002/0136187 A1 * | 9/2002 | Aoyama | H04W 16/28 370/342 |
| 2003/0123407 A1 | 7/2003 | Arimitsu | |
| 2004/0152458 A1 | 8/2004 | Hottinen | |
| 2005/0147024 A1 | 7/2005 | Jung | |
| 2005/0201486 A1 | 9/2005 | Han | |
| 2005/0286408 A1 * | 12/2005 | Jin | H04L 5/0048 370/208 |
| 2006/0002453 A1 | 1/2006 | Song | |
| 2006/0067205 A1 | 3/2006 | Jung | |
| 2006/0079221 A1 | 4/2006 | Grant et al. | |
| 2006/0291371 A1 * | 12/2006 | Sutivong | H04B 1/713 370/208 |
| 2007/0070944 A1 | 3/2007 | Rinne | |
| 2007/0082692 A1 | 4/2007 | Tirkkonen | |
| 2007/0160162 A1 | 7/2007 | Kim | |
| 2008/0019452 A1 | 1/2008 | Hoshino | |
| 2009/0201849 A1 | 8/2009 | Sawahashi | |
| 2009/0296585 A1 * | 12/2009 | Melis | H04L 25/022 370/241 |

OTHER PUBLICATIONS

Grant, S., et al., Per-Antenna-Rate-Control (PARC) inFrequency Selective Fading with SIC-GRAKE Receiver, Vehicular Technology Conference, 2004. VTC2004-Fall. 2004 IEEE 60th, vol. 2, no. pp. 1458, 1462 vol. 2, Sep. 26-29, 2004.

Bottomley, G., et al., A Generalized RAKE Receiver for Interference Suppression. IEEE Journal on Selected Areas in Communications. vol. 18, No. 8, Aug. 2000.

3GPP. 3rd Generation Partnership Project; Technical Specification Group Radio Access Network; Physical layer procedures (FDD) (Release 5). 3GPP TS 25.214 v5.3.0 (Dec. 2002).

3GPP. 3rd Generation Partnership Project; Technical Specification Group Radio Access Network; Physical Layer Procedures (FDD) (release 5), 3GPP TS 25.214 v.5.9.0 Jun. 2004.

Goldsmith, et al., Capacity Limits of MIMO Channels, IEEE Journal on Selected Areas of Comm., vol. 21, No. 5, Jun. 2003.

3GPP, 3rd Generation Partnership Project; Technical Specification Group Radio Access Network; Physical Channels and Mapping of Transport Channels onto Physical Channels (FDD)(release 5). 3GPP TS 25.211 v5.5.0. Sep. 2003.

Chung, et al., Approaching Eigenmode BLAST Channel Capacity using V-BLAST with Rate and Power Feedback. Proc. IEEE VTOC'01Fall, Oct. 2001.

* cited by examiner

... (additional sequences $s'_4$ through $s'_{32}$)

*Fig. 4b*

METHOD AND ARRANGEMENT FOR PILOT PATTERN BASED CONTROL SIGNALING IN MIMO SYSTEMS

CROSS-REFERENCE TO RELATED APPLICATIONS

This application is a continuation of co-pending U.S. patent application Ser. No. 14/549,304 filed on Nov. 20, 2014, now U.S. Pat. No. 9,813,211, which is a continuation of U.S. patent application Ser. No. 12/514,762 filed on May 13, 2009, now U.S. Pat. No. 8,923,423, which is a 371 of International Application No. PCT/SE2006/050469, filed Nov. 13, 2006, the disclosures of which are fully incorporated herein by reference.

TECHNICAL FIELD

The present invention relates to a method and arrangement of providing control signaling. In particular, the present invention relates to control signaling in MIMO based communication systems.

BACKGROUND

The demand for traffic capacity, coverage and reliability in the wireless communication systems is seemingly ever-increasing. One bottleneck in the traffic capacity is the limited frequency spectrum available for communication purposes, the limitation being both physical—only part of the frequency spectrum is suitable for communication and the information content per frequency and time is limited, and organizational—the useful part of the spectrum is to be used for a number of purposes including: TV and radio broadcast, non-public communication such as aircraft communication and military communication, and the established systems for public wireless communication such as GSM, third-generation networks (3G), Wireless Local Area Networks (WLAN) etc. Recent development in the area of radio transmission techniques for wireless communication systems show promising results in that the traffic capacity can be dramatically increased as well as offering an increased flexibility with regards to simultaneously handling different and fluctuating capacity needs. Promising techniques are based on the concept of Multiple-Input-Multiple-Output (MIMO) see for example A. Goldsmith et al. "Capacity Limits of MIMO Channels", IEEE Journal on Selected Areas of Comm., VOL. 21, NO. 5, JUNE 2003. Compared to presently used transmission techniques such as TDMA (as used in GSM) and WCDMA (as used in UMTS), the above exemplified technique represents a much better usage of the available radio frequency spectrum. As an example of the capabilities of, but also the requirement set forth by, the new transmission techniques, the MIMO wireless systems will be briefly described with references to FIG. 1 (prior art). A comprehensive description of the basic principles as well as recent development and areas of research of MIMO is to be found in the above referred article by A. Goldsmith et al.

A radio link in a MIMO system is characterized by that the transmitting end as well as the receiving end may be equipped with multiple antenna elements. The idea behind MIMO is that the signals on the transmit (TX) antennas at one end and the receive (RX) antennas at the other end are "combined" in such a way that the quality (bit-error rate, BER) or the data rate (bits/sec) of the communication for each MIMO user will be improved. Such an advantage can be used to increase both the network's quality of service and the operator's revenues significantly. A core idea in MIMO systems is space-time signal processing in which time (the natural dimension of digital communication data) is complemented with the spatial dimension inherent in the use of multiple spatially distributed antennas. A key feature of MIMO systems is the ability to turn multipath propagation, traditionally regarded as a limiting factor in wireless transmission, into a benefit for the user. MIMO effectively takes advantage of random fading and when available, multipath delay spread, for increasing transfer rates. The prospect of significant improvements in wireless communication performance at no cost of extra spectrum (only hardware and complexity are added) has naturally attracted widespread attention. MIMO is, due to the promising possibilities, considered for enhancing data rates in third generation cellular systems, specifically for the High-Speed Downlink Shared Channel (HS-DSCH).

The multiplexing alone is, as previously mentioned, not enough for achieving the dramatic increase in gain. Advanced coding/decoding and mapping schemes, e.g. the space-time coding, is essential. A knowledge of the radio channel is needed for the decoding already in today's existing wireless systems such as GSM and UMTS, and in the multi-antenna systems this knowledge is absolutely critical. In some of the most promising implementation proposals for MIMO, the knowledge of the channel, is used not only in the demodulation performed in the receiver side, but also in the encoding and modulation on the transmitting side when the system employs adaptive rate control. With adaptive rate control, the transmitter determines a transmission rate appropriate for a given radio channel condition. When the channel condition is good, a high transmission rate is used, whereas when the channel condition is bad, a low transmission rate is used. The transmission rate determines the modulation order (e.g., QPSK versus 16QAM) and the coding rate of forward error-correction code (FEC) on the transmitting side. Accurate rate control is highly desirable in that it improves system and user throughput. In WCDMA release 5, transmission rate control is facilitated by a channel quality indicator (CQI) feedback provided by a mobile terminal or user equipment. The CQI indicates the receiver signal-to-interference-plus-ratio (SINR) under the current radio condition. In essence, a CQI indicates the highest transmission data rate in order to achieve a certain block error rate (e.g., 10%) under current radio condition. The use of CQI according to WCDMA release 5 is described in 3rd Generation Partnership Project (3GPP), Technical Specification Group Radio Access Networks: Physical channels and mapping of transport channels onto physical channels (FDD), 3GPP TR 25.211, version 5.5.0, September 2003, and in 3rd Generation Partnership Project (3GPP), Technical Specification Group Radio Access Networks: Physical Layer Procedures (FDD) 3GPP TR 25.214, version 5.9.0, June 2003.

Auxiliary control signaling may be needed to facilitate accurate CQI estimation and rate control in a MIMO system. For example, instantaneous power and code allocation may be signaled from the base station to mobile terminals to facilitate CQI estimation. Since this type of information is signaled to all the mobile terminals in the system, this may be considered as a broadcast control information. Other broadcast control information may also be needed to facilitate accurate CQI estimation.

In UMTS a common pilot channel (CPICH) is used for the characterization of the dedicated radio channel First, the receiver relies on the CPICH to obtain an estimate of the channel impulse response that is needed during demodulation. With adaptive rate control, the receiver may also use the CPICH to estimate the highest transmission rate that the current channel condition may support in order to satisfy a targeted block error rate requirement. This transmission rate is then communicated back to the transmitter in a form of channel quality indicator (CQI) per WCDMA release 5. The CPICH is a code channel carrying known modulated symbols scrambled with a cell-specific primary scrambling code. UMTS also provides for secondary CPICHs, which may have individual scrambling codes, which typically are used in operations of narrow antenna beams intended for service provision at places with high traffic density. A similar approach is suggested for MIMO based systems. In MIMO a plurality of common pilot channels (CPICHs), corresponding to the number of transmitting antennas or antenna streams, are used to characterize each of the channels between a transmit antenna and a receive antenna. The requirement for accurate channel characterization in combination with the plurality of CPICHs can make the control signaling relatively extensive, and will take up valuable transmission resources.

Recently, a promising new MIMO technique called PARC (Per-Antenna-Rate-Control) [1] has been proposed for use with HS-DSCH, see S. T. Chung et. Al, *"Approaching eigenmode BLAST channel capacity using V-BLAST with rate and power feedback"*, Proc. IEEE VTC'01-*Fall*, Atlantic City, N.J., October 2001. The scheme is based on a combined transmit/receive architecture that performs independent coding of the antenna streams at different rates, followed by the application of successive interference cancellation (SIC) and decoding at the receiver. It requires feedback of the per-antenna rates which are based on the signal-to-interference-plus-noise ratios (SINRs) at each stage of the SIC. With this scheme, it has been shown that the full open-loop capacity of the MIMO flat-fading channel may be achieved, thus offering the potential for very high data rates.

The anticipated advantages of novel transmission techniques such as MIMO, PARC-MIMO and cooperative relaying is well demonstrated in the art. However, to fully take advantage of the increased data rates, the control signaling must not be allowed to become too extensive.

SUMMARY

To fully take advantage of the potentially high data rates offered by novel transmission techniques such as MIMO and PARC-MIMO, the requirement for feedback is high. At the same time, the amount of control signaling must be kept at a reasonable level. Therefore, improved control signaling procedures are needed.

The object of the present invention is to provide a method and arrangements that overcome the drawbacks of the prior art techniques.

In the method according to the invention, control information is transferred from a first radio node to at least one second radio node via a plurality of common pilot channels. A set of unique pilot sequences has been pre-defined, and the first radio node assigns specific pilot sequences from the set of pilot sequences to specific common pilot channels, forming a pilot sequence assignment pattern representing specific control information. The second radio node, having knowledge of the relations between pilot sequence assignment patterns and control information, interprets the received pilot sequence assignment pattern as the specific control information. The method is particularly well-suited for broadcast-type control information, and the first radio node is typically a radio base station, and the second radio node is typically a user equipment.

Preferably the method comprises the steps of:
the radio base station recognizing a need for updating of broadcast-type control information;
the radio base station selecting a pilot sequence assignment pattern, based on a pre-determined relation between sequence assignment patterns and control signaling information, and transmitting pilot sequences on the common pilot channels according to the selected pilot sequence assignment pattern;
the user equipment receiving the pilot sequences and determining pilot sequence assignment pattern by detecting the selection of pilot sequence transmitted by the radio base station;
the user equipment extracting the control signaling by using the pre-determined relation between sequence assignment patterns and control signaling information.

The individual pilot sequences as well as the relations between pilot sequence assignment patterns and the control information is preferably shared between all relevant nodes or entities, in the communication system. Even more preferably the relations are standardized.

The method could advantageously be used to broadcast information about the current power and/or code allocation of the base station to the user equipment. Another type of control information suitable to be broadcasted in this manner relates to network controlled feedback. In a network control feedback scenario, a feedback threshold parameter can be broadcasted from the base station to indicate to each user equipment the conditions under which the user equipment is allowed to feed back different amount or type of information.

One advantage afforded by the present invention is the possibility to transfer control information without taking up valuable radio resources.

A further advantage is that the detections of individual pilot sequences can be made with conventional methods and means and are not excessively complex or capacity consuming.

Yet a further advantage is that the method according to the invention is well suited for broadcasting code and power allocations associated with the promising PARC-MIMO technologies. The method according to the invention may also be applied to other access technologies such as Orthogonal Frequency Division Multiplexing (OFDM) as discussed in connection with the long term evolution of UMTS and 4G.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein

FIGS. 4*a*-4*b* schematically illustrate pilot sequences, (a) un-shortened and (b) shortened, suitable for an embodiment of the invention;

DETAILED DESCRIPTION

Figure 1:
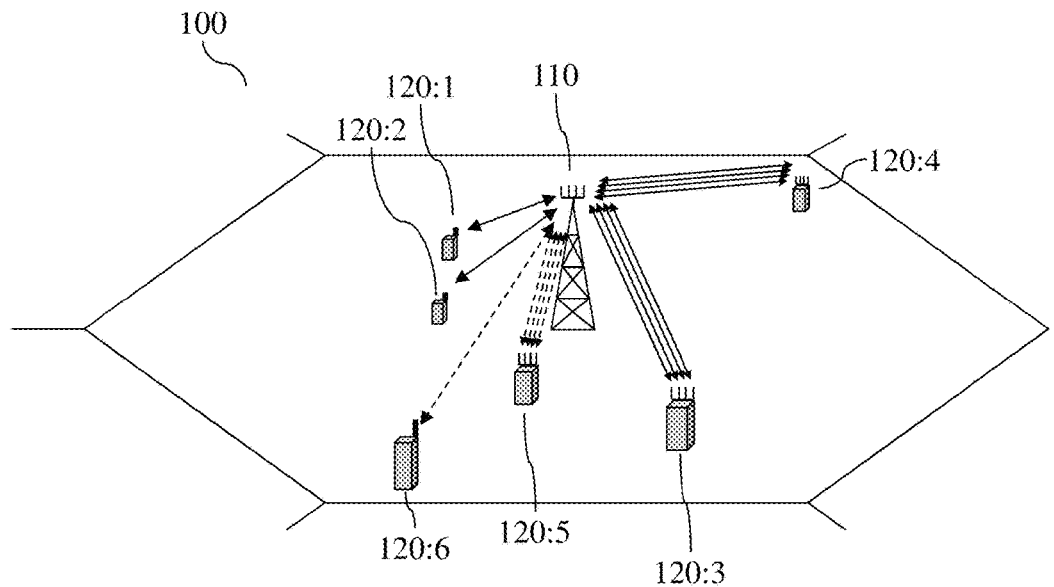
FIG. 1 is a schematic illustration of a wireless communication system wherein the methods and arrangement according to the present invention may be implemented.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

A possible communication scenario wherein the method and arrangement according to the present invention is schematically illustrated in FIG. 1. The wireless communication network 100 comprises a radio base station, BS, 110, sometimes also in the art referred to as a node B, and a plurality of User Equipments, UEs, 120:1-6. Some of the UEs, 120:1-4 are in active communication with the BS 110, which in the figure is indicated with solid arrows, while the other UEs 120:5-6 are in a standby mode, however still maintaining some control signaling with the BS 110 (dashed arrows). The BS 110 and at least some of the UEs, UEs 120:3-5, are configured to communicated over a plurality of links, for example multi-antenna arrangements adapted for MIMO-based communication. The channel characterization relies on pilot signaling on the common pilot channels, the CPICH channels. Each transmit antenna, or antenna stream is associated with one CPICH.

The term "radio base station" should be given a broad interpretation, including the meaning of a BS as it is conceived in current wireless systems such as GSM and UMTS, but also a radio node that does not have to be fixed, and/or only occasionally has the role of a BS, in for example an Ad-hoc network.

The UEs may for example be a mobile phone, a user equipment of various kinds: such as laptop computers, PDAs, cameras, video/audio players and game pads provided with radio communication abilities, a vehicle or a stationary machine provided with radio communication abilities.

According to the method of the invention, a set of pilot sequences has been defined, each pilot sequence comprising a pre-determined number of symbols. In a pilot signaling procedure in the BS 110 each pilot channel is assigned a specific pilot sequence from the set of pilot sequences. By letting a certain assignment of pilot sequences to the pilot channels representing a specific information, signaling information is conveyed to the UEs. It can be seen as a specific pilot sequence assignment pattern corresponding to a specific information representation. The UEs 120, having knowledge of the set of pilot sequences and the information represented by different assignment patterns, can derive the signaling information by identifying which pilot sequences that were transmitted. The nature of this signaling, conveyed on pilot channels, makes it best suitable for broadcast-type control signaling. The pilot sequences and the information represented by the pilot sequence assignment patterns is preferably standardized.

Figure 2:
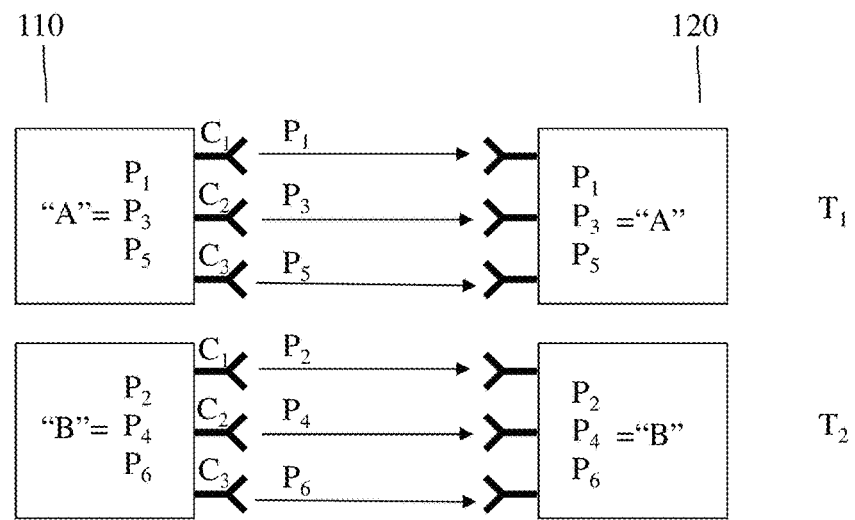
FIG. 2 illustrates schematic illustrations of the principles of conveying control information according to the present invention.

The principle of the invention is schematically outlined in FIG. 2. In FIG. 2, three antennas $C_1$, $C_2$ and $C_3$ and a set of separate pilot signals or sequences, $\{P_1, P_2, \ldots P_6\}$, for example, are available. At a first time instance, $T_1$, pilot sequence $P_1$ is transmitted from antenna $C_1$, $P_3$ from $C_2$, and $P_5$ from $C_3$, representing first information, illustrated with "A". At a second time instance $T_2$, $P_2$ is transmitted from antenna $C_1$, $P_4$ from $C_2$, and $P_6$ from $C_3$, representing second information, illustrated with "B".

Figure 3:
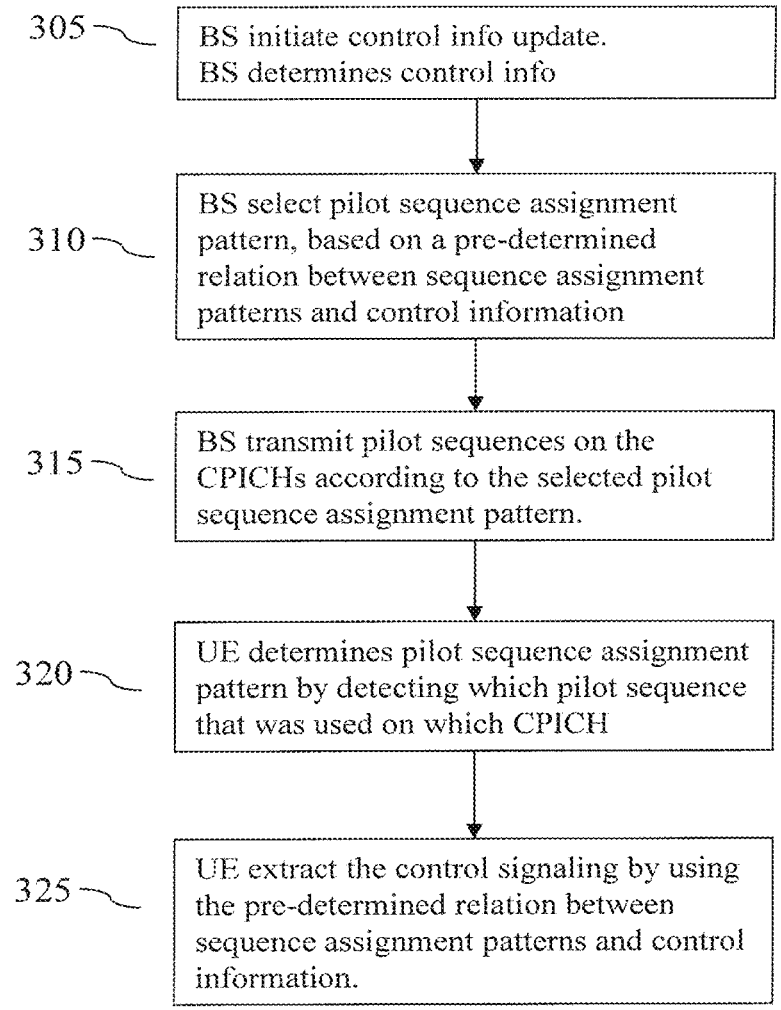
FIG. 3 is a flowchart illustrating a first embodiment of the method according to the present invention.

The method according to the invention, suitable for the communication system outlined in FIG. 2, will be described with reference to the flowchart of FIG. 3, and comprises the steps of:

305: An update of broadcast-type parameters is initiated or recognized by the BS 110. The BS determines control information to be broadcasted, for example a parameter value or values.

310: The BS 110 selects a pilot sequence assignment pattern, based on a pre-determined relation between sequence assignment patterns and control information. The pre-determined relation may for example be in a form of a concordance list, shared between all nodes in the system, relating pilot sequence assignment patterns to specific information, parameter values etc.

315: The BS 110 transmitting pilot sequences on the CPICHs according to the selected pilot sequence assignment pattern.

320: A UE 120 receives the pilots and determines the pilot sequence assignment pattern by detecting which pilot sequence was used on which CPICH.

325: The UE 120 extracts the control signaling by using the pre-determined relation between sequence assignment patterns and control information. For example, the type of control information and an associated parameter value can be derived by comparing the determined pilot sequence assignment pattern with the pre-determined concordance list.

Figure 4A:
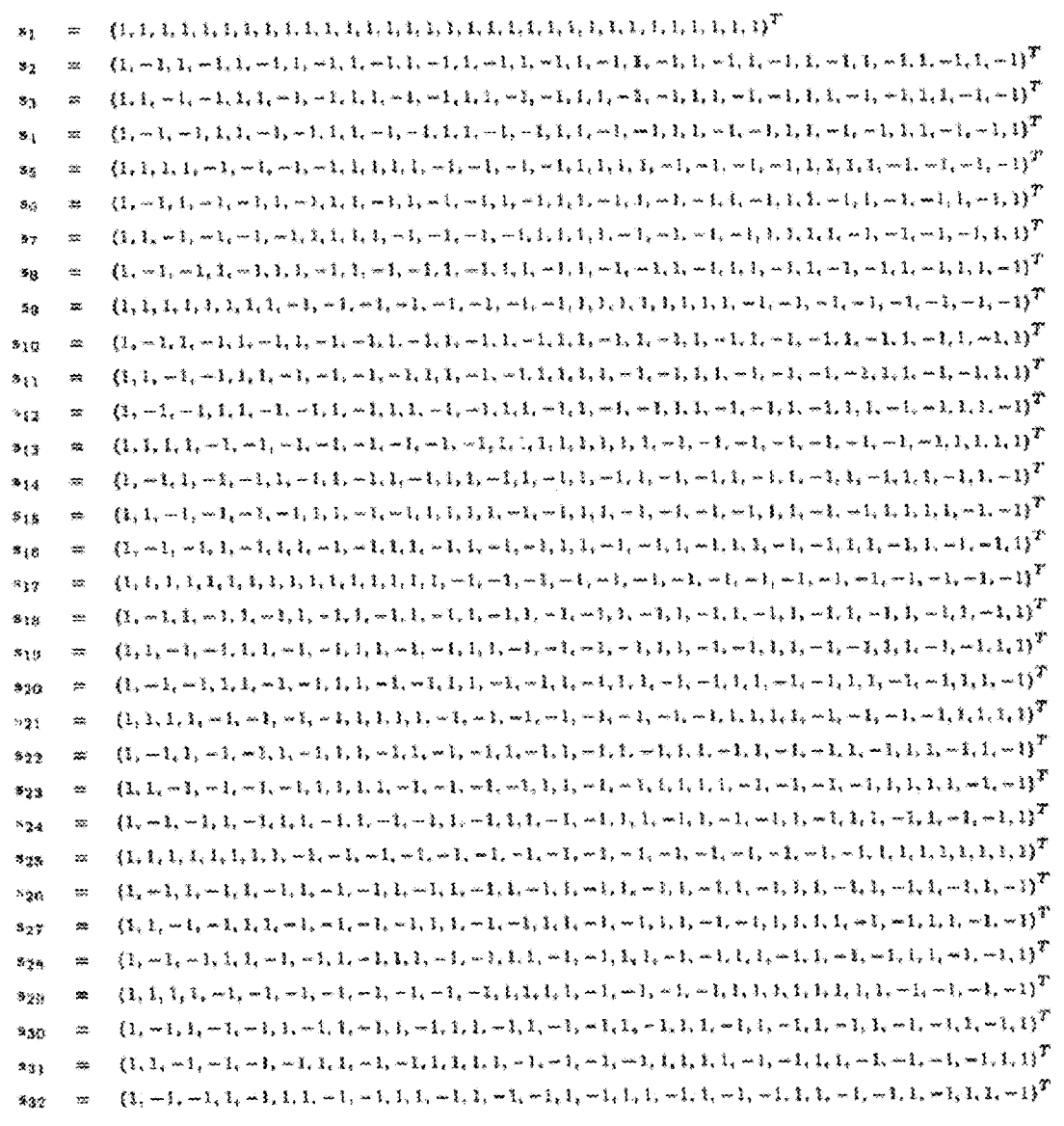

A preferred embodiment of the invention is applicable to MIMO-based systems using more than two antennas. For a MIMO system to achieve significant gains over a SIMO system, often 4 transmit antennas are needed. According to this embodiment control information is signaled in the CPICH channels from transmit antennas 3 and 4. A set of pilot sequences, $S=\{s_1, s_2, s_3 \ldots \}$ is determined to be used in the system. Following the same CPICH spreading factor and transmission time interval, TTI, length as in Rel. 5, there are 30 pilot symbols per TTI. Pilot sequences can be chosen in a number of ways. A suitable choice is to use shortened Hadamard sequences. An example of length-32 Hadamard sequences is illustrated in FIG. 4*a*. These sequences may be shortened in a simple way by taking the first 30 bits of each sequence, giving a set of (shortened) pilot sequences $S'=\{s'_1, s'_2, s'_3, \ldots, s'_{30}\}$ as illustrated in FIG. 4*b*. According to the embodiment the pilot patterns of CPICH on 3rd and 4th antennas are determined based on 4 downlink signaling bits. These downlink signaling bits can for example be used to signal instantaneous power and code allocation to the UEs. Since this information is updated in everyTTI, the SINR scaling error can be minimized, which will be discussed below. An example of how pilot patterns are determined is shown in Table 1.

TABLE 1

Pilot patterns on 3rd and 4th antennas.

| $x_4$ | $x_3$ | $x_2$ | $x_1$ | CPICH on antenna 3 | CPICH on antenna 4 |
|---|---|---|---|---|---|
| 0 | 0 | 0 | 0 | $s'_1$ | $s'_2$ |
| 0 | 0 | 0 | 1 | $s'_3$ | $s'_4$ |
| 0 | 0 | 1 | 0 | $s'_5$ | $s'_6$ |
| 0 | 0 | 1 | 1 | $s'_7$ | $s'_8$ |
| 0 | 1 | 0 | 0 | $s'_9$ | $s'_{10}$ |
| 0 | 1 | 0 | 1 | $s'_{11}$ | $s'_{12}$ |
| 0 | 1 | 1 | 0 | $s'_{13}$ | $s'_{14}$ |
| 0 | 1 | 1 | 1 | $s'_{15}$ | $s'_{16}$ |
| 1 | 0 | 0 | 0 | $s'_{17}$ | $s'_{18}$ |
| 1 | 0 | 0 | 1 | $s'_{19}$ | $s'_{20}$ |
| 1 | 0 | 1 | 0 | $s'_{21}$ | $s'_{22}$ |
| 1 | 0 | 1 | 1 | $s'_{23}$ | $s'_{24}$ |
| 1 | 1 | 0 | 0 | $s'_{25}$ | $s'_{26}$ |
| 1 | 1 | 0 | 1 | $s'_{27}$ | $s'_{28}$ |
| 1 | 1 | 1 | 0 | $s'_{29}$ | $s'_{30}$ |
| 1 | 1 | 1 | 1 | $s'_{31}$ | $s'_{32}$ |

Here $x_1$, $x_2$, $x_3$ and $x_4$ are the four downlink signaling bits. In the example of signal power and code allocation, the four signaling bits can be used to signal 16 quantized combinations of instantaneous power and code allocation. Alternatively, they can be used to signal 16 quantized instantaneous power allocation in one TTI, and 16 quantized instantaneous code allocation in the next TTI. Alternatively, the four signaling bits can be used to signal only the instantaneous code allocation in every TTI.

In order to extract the signaling information bits, the UE needs to correlate with all possible pilot sequences in the set of pilot sequences to determine which pilot sequence is the most likely one used on antennas 3 and 4. Such correlations are known in the art and fairly simple operations and thus do not give rise to much complexity overhead. Further, the power allocated to CPICHs is strong enough for the UE to estimate channel coefficients. Such CPICH power will be sufficient for the UE to make a reliable decision first regarding which pilot sequence is used, because in making such a decision the UE enjoys a very large processing gain (7680). Thus, $x_1$, $x_2$, $x_3$ and $x_4$ can be detected reliably. After determining which pilot pattern is used, the UE may perform channel and CQI estimation in the same way as any of the conventional methods. According to the method of the invention, there is no increase in code and power overhead associated to the signaling of these additional downlink signaling bits.

As appreciated by the skilled in the art, the above scheme can be extended to encompass more than four signaling bits, by using a larger set of pilot sequences. However, some practical limitations are given by the number of possible pilot sequences for a given TTI length.

Other types of signaling information than the above exemplified may by conveyed in the pilot signaling according to the invention. The broadcast nature of the signaling information provided by the invention makes it best suited for broadcast or multicast control information. The control information may be updated every TTI, without increasing the load in the system, making the invention particular suitable for fairly rapidly changing broadcast-type information. Such signaling information include, but is not limited to the above mentioned signal power and code allocation and parameters needed for network controlled feedback, See U.S. Patent Application 20060079221 "Network Controlled Feedback for MIMO Systems". For network controlled feedback, a parameter named "feedback threshold" is broadcast by the base station to control the amount of feedback traffic in the uplink. The feedback threshold can be a SINR value. In this case, only user equipment which have received SINR higher than the SINR threshold are allowed to feed back detailed channel quality information. Alternatively, the feedback threshold can be a scheduling metric. In this case, only user equipment which have scheduling metrics higher than the feedback threshold are allowed to feed back detailed channel quality information. According to the present invention, this feedback threshold may by conveyed in the pilot symbol patterns assigned to transmit antennas 3 and 4.

The invention has so far, for the reason of clarity only, been described in a downlink scenario. As appreciated by the skilled in the art a similar approach can be utilized also in uplink. The method can be used also in Ad hoc networks wherein a UE temporarily acts as a base station and distribute pilot signals.

Figure 5A:
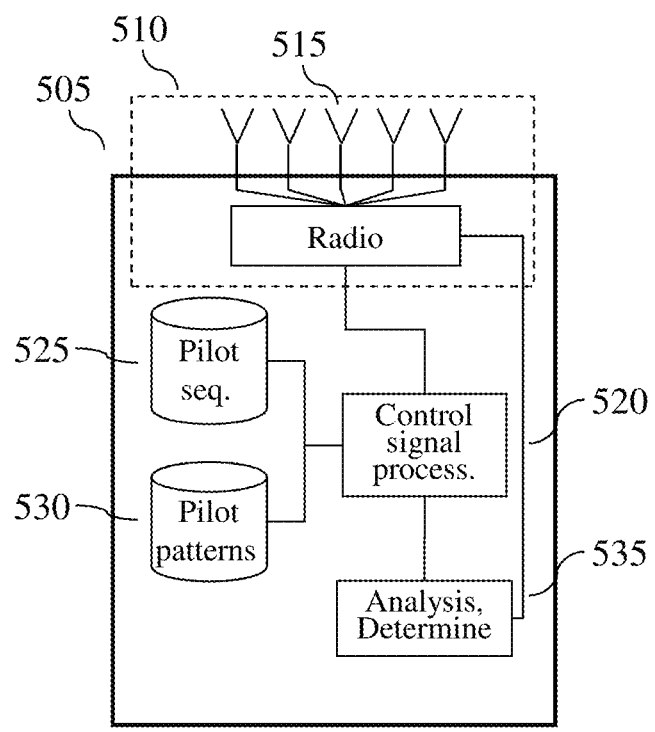
FIGS. 5*a*-5*b* schematically illustrate a radio base station and user equipment according to the present invention.
Figure 5B:
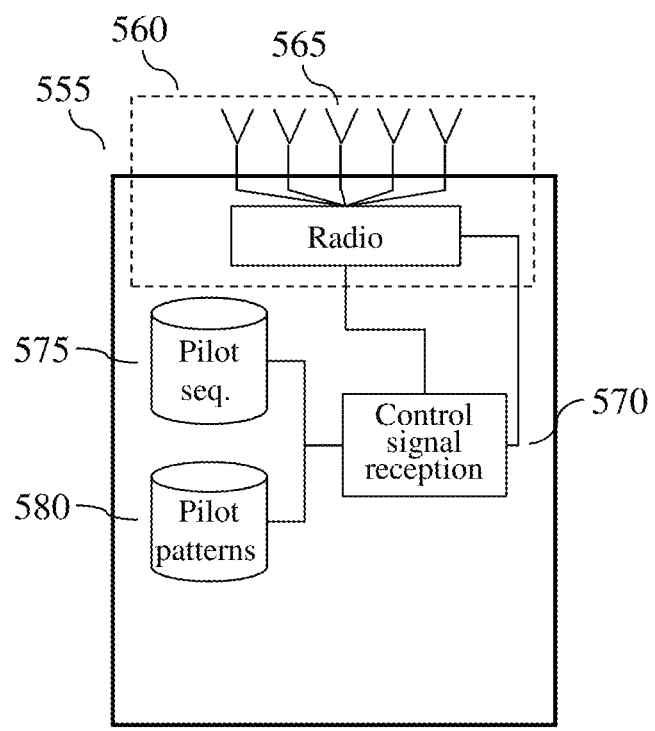

Arrangements according to the present invention in a radio base station and user equipment, respectively, suitable for effectuating the above described embodiments are schematically illustrated in FIGS. 5a and 5b. The modules and blocks according to the present invention are to be regarded as functional parts of a base station and/or a user equipment in a communication system, and not necessarily as physical objects by themselves. The modules and blocks are preferably at least partly implemented as software code means, to be adapted to effectuate the method according to the invention. However, depending on the chosen implementation, certain modules may be realized as physically distinctive objects in a receiving or sending node. The term "comprising" does primarily refer to a logical structure and the term "connected" should here be interpreted as links between functional parts and not necessarily physical connections. As is well known in the art, a specific function can be made to reside in different nodes in the communication system, depending on the current implementation. Thus, the means in the following ascribed to a sending/receiving node (base station or a user equipment), could at least partly be implemented in another node in the system, for examples in a radio network controller (RNC), but made to effectuate the signalling from the sending/receiving node.

The base station 505 comprises radio communication means 510, which provides the necessary functionalities for performing the actual reception and transmission of radio signals and is well known by the skilled person. The base station is typically a part of an access network. The radio communication means 510 are adapted for communication via a plurality of antennas 515. An antenna stream and one CPICH are associated to each antenna. The radio communication means 510 is connected to control signal processing means 520 adapted to handle control signalling with other radio nodes. According to the invention the radio communication means 510 and the control signal processing means 520 of the base station 505 are adapted to effectuate transmission of different pilot sequences on different antennas. The control signal processing means 520 is connected to a pilot sequences storage 525 storing the pilot sequences relevant for the communication system. The control signal processing means 520 is further connected to a pilot sequences pattern storage 530 comprising a list of the pre-determined relation between specific pilot sequences patterns and specific control information. The base station may further comprise analysing and determining means 535, in connection with the radio communication means 510 and the control signal processing means 520, adapted to, for example, collect and analyse data on signal quality and to determine suitable code and power allocation. A requirement for control signalling may be recognized by the analysing and determining means 535, or communicated to the base station from other parts of the access network. Upon such request the control signal processing means 520 determines the pilot sequences pattern, or patterns, by retrieving the relation between the control information and the pilot sequences pattern from the pilot sequences pattern storage 530. The individual pilot sequences are retrieved from the sequences storage 525 by the control signal processing means 520. The control signal processing means 520 has thus determined a set of pilot sequences and instructs the radio communication means 510 to transmit the set.

The user equipment 555 comprises radio communication means 560, which provides the necessary functionalities for performing the actual reception and transmission of radio signals and is well known by the skilled person. The user equipment is preferably provided with a plurality of antennas 565 and the radio communication means are capable of discerning signals simultaneously transmitted on different channels, for example different pilot sequences. Control signal reception means 570 is adapted to handle the control signalling of the user equipment. According to the invention the user equipment 555 is provided with a pilot sequences storage 575, in connection with control signal processing means 570, and arranged to store the pilot sequences used in the communication system. The control signal processing means 570 is further connected to a pilot sequences pattern storage 580 comprising the list relating specific pilot sequences patterns with specific control information. The control signal processing means 570 is adapted to use information retrieved from the pilot sequences pattern storage 580 to interpreted the meaning of a received pilot sequences pattern. The thus received and interpreted control information may for example be used by the control signal processing means 570 to instruct the radio communication means 560 to adjust transmission parameters in further communication.

The user equipment may for example be a mobile station, a laptop computer, a PDA, a camera, a video/audio player or a game pad provided with radio communication abilities. Other examples include, but is not limited to machinery provided with radio communication abilities, such as vehicles or stationary machines such as automatic vending machines.

An implementation of the invention will be described with reference to PARC-MIMO used for HS-DSCH as a non-limiting example. In PARC-MIMO it is of high importance for maintaining a high CQI estimation accuracy, that the BS 210 can broadcast updates of power and/or code allocation information to the UEs. The information facilitates accurate SINR estimates in the UEs. As indicated in the background PARC-MIMO requires feedback of the per-antenna rates which are based on the signal-to-interference-plus-noise ratios (SINRs) at each stage of the SIC.

Figure 6:
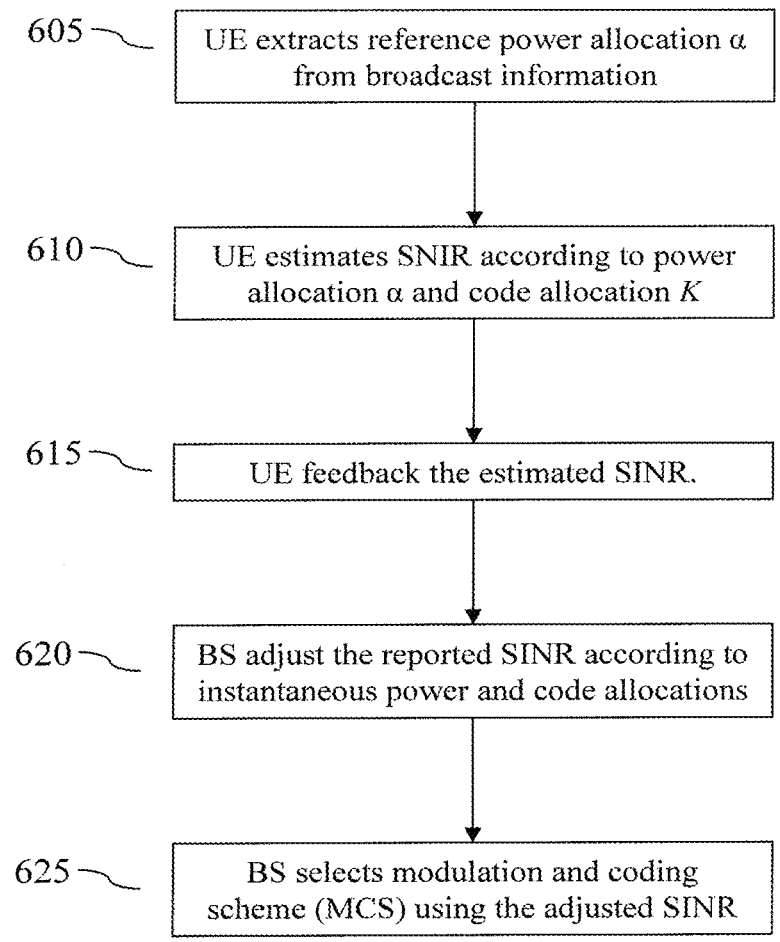
FIG. 6 is a flow chart illustrating a second embodiment of the method according to the present invention.

SINR feedbacks are already needed for the rate adaptation process employed for HS-DSCH to enhance the spectral efficiency. With rate adaptation, the Node B selects an appropriate data transmission rate suitable for a given channel condition. Thus, when the channel is in a deep fade, a lower data transmission rate is used, whereas when the channel condition is good, a higher data transmission rate is used. Rate adaptation can also be used to account for the variation of code and power availability. When the Node B has lots of available codes and available power, a higher data transmission rate is used. On the other hand, when the Node B has only very limited amount of unused codes and power, a lower data transmission rate is used. The adaptation process is illustrated in FIG. 6. To facilitate rate adaptation, all the standby UEs have to report back, step 615 to the Node B a channel quality indicator (CQI), which is typically a quantized version of the RAKE receiver SINR, measured, for example, at the output of SIC-GRAKE receiver. The SINR can be the symbol SINR on a single code of the HS-DSCH, or can be the aggregate SINR on all the codes of HS-DSCH. Note that the aggregate SINR on all the codes is simply the symbol SINR on a single code times the number of codes allocated to the HS-DSCH. For the purpose of this description CQI will be equated to the symbol SINR at the output of SIC-GRAKE. In the rate adaptation process, a UE, without the knowledge of instantaneous code and power available at the serving Node B, typically estimates in step 610 the output symbol SINR according to a nominal code and power allocation. In SISO operations, nominal code allocations are defined in CQI tables, standardized by the 3GPP, used for rate adaptation, where the nominal power allocation is signaled in one of the downlink control channels, step 605. Note that these nominal code and power allocations are established for the purpose of CQI measurement and reporting, and are not intended for reflecting the actual code and power availability at Node B. In fact, the control channel that carries the nominal power allocation has a very slow update rate.

After receiving the CQI feedback, the Node B would need to scale the reported SINR according to the instantaneous code and power that will be allocated to the UE, step 620. This adjusted SINR is then used to select an appropriate modulation and coding scheme (MCS) in step 625.

In a MIMO based system, scaling process performed in Node B is under certain circumstances non-trivial. In general, the output symbol SINR in dB can be modeled approximately as a linear function of code and power allocation. However, the linear scaling slope depends on $I_{or}/I_{oc}$, multipath delay profile, as well as the code and power allocation. Here, $I_{or}$ is the total power received from the serving Node B, and $I_{oc}$ is the total power received from all the other base stations plus thermal noise. SINR scaling at the Node B, if not done correctly, will result in the adjusted SINR to be very different from the true SINR. If the adjusted SINR is too high, the selected transmission data rate is higher than the rate that the radio channel can support. This often results in errors in the transmitted data. If the adjusted SINR is too low, the selected transmission data rate is lower than the rate that the radio channel can support. In either case, the system throughput is degraded.

The G-RAKE output symbol SINR can be described as:

$$SINR = \frac{\alpha}{K} h^H R^{-1} h \qquad (1)$$

where $\alpha$ and K are the total power and number of spreading codes allocated to the HS-DSCH, respectively, and h and R are net response and impairment covariance matrix, respectively. The ratio $\alpha/K$ can be interpreted as the power allocated to each of the HS-DSCH codes. In SISO Systems, the noise covariance matrix R can be measured directly from the CPICH. It can be shown that in the SISO case, R is independent of power allocation on the downlink code channels. As a result, SINR in dB scales linearly, with slope 1 or −1 with respect to power allocation ($\alpha$) and code allocation (K), respectively.

For rate adaptation in a SISO System, the UE estimates an SINR based on reference power and code allocations $\alpha_{ref}$ and $K_{ref}$, respectively. The factors $\alpha_{ref}$ and $K_{ref}$ are established as a common reference for the purpose of SINR estimation, and are typically not the same as the actual instantaneous power and code allocations, denoted by $\alpha_{inst}$ and $K_{inst}$, respectively. In this setup, the SINR estimated in the UE is therefore $$SINR_{ref} = \frac{\alpha_{ref}}{K_{ref}} h^H R^{-1} h \qquad (2)$$

The estimated SINR will then be reported back to the Node B through CQI feedbacks. and the Node B will need to scale $SINR_{ref}$ for the instantaneous power and code allocations. Note that the instantaneous SINR is $$SINR_{inst} = \frac{\alpha_{inst}}{K_{inst}} h^H R^{-1} h = \frac{\alpha_{inst}}{\alpha_{ref}} \left(\frac{K_{inst}}{K_{ref}}\right)^{-1} SINR_{ref} \qquad (3)$$

Converting eq. (3) to dB yields:

$$(SINR_{inst})_{dB} = \left(\frac{\alpha_{inst}}{\alpha_{ref}}\right)_{dB} - \left(\frac{K_{inst}}{K_{ref}}\right)_{dB} + (SINR_{ref})_{dB} \qquad (4)$$

Thus. the instantaneous SINR in dB scales linearly with both power and code adjustments. and with scaling slopes 1 and −1, respectively.

In the PARC case, the SIC-GRAKE Output SINR for the m:th stream can be shown as $$SINR(m) = \frac{\alpha(m)}{K} h^H(m) R^{-1}(m) h(m) \qquad (5)$$

where $\alpha(m)$ is the power allocated to MIMO channels on antenna (or data stream) m, K is the number of MIMO channelization codes, and h(m) and R(m) are respectively, the net response and noise covariance for the m:th stream. The noise covariance for the m:th decoded stream can be expressed as [3]

$$R(m) = R_{cpich} + R_{CR}(m) - R_{SIC}(m) \qquad (6)$$

where $R_{cpich}$ is the noise covariance measured from the CPICH, $R_{cr}$ is contributed by code-reuse interference, and $R_{sic}(m)$ accounts for the interference removed during the SIC process prior to the m:th decoding stage. The code-reuse term $R_{cr}$ is given as $$R_{CR}(m) = \frac{\alpha}{K} \sum_{n=m+1}^{M} h(n) h^H(n) \qquad (7)$$

Wherein it is assumed that the MIMO power is evenly distributed across active transmit antennas, $\alpha(1)=\alpha(2)=\alpha(M)=\alpha$, where $M\alpha$ is the total base station power allocated to the MIMO user of interest, and $\alpha/K$ is the power per MIMO code, per active transmit antenna. It should be noted that $R_{cr}$ depends on power and code allocations. Furthermore, the term $R_{sic}(m)$ also depends on MIMO power allocation $\alpha$ because SIC is applied to own MIMO signals only. These two factors impact the SINR scaling issue significantly because in this case SINR(m) depends on K and $\alpha$ in a more convoluted manner, $$SINR(m) = \frac{\alpha}{K} h^H(m) R^{-1}(m, \alpha, K) h(m) \qquad (8)$$

In this case, SINR scaling is much more complicated than what equation (3) indicates. Thus, for the PARC case, it is beneficial to signal the code and power availability to the user equipment. This way there is no need to further scale the reported CQI. Or, the error introduced in the SINR scaling step can be minimized if there is a change in instantaneous code and power availability since the last time such information is provided. Using the method of the invention, code and power allocation can be signaled by selecting the pilot symbol patterns to be transmitted by antennas 3 and 4. For example, using a scheme as described in Table 1, 4 bits of control information can be signaled. The base station can use these 4 bits to signal 16 different code allocations, or 16 different power allocations, and 16 different combinations of code and power allocation.

The method and arrangement according to the invention have been described primarily with reference to MIMO-based systems. It should be noted that the method and arrangement equally well may be utilized also in other communication systems utilizing a plurality of radio paths for the communication between radio nodes, for example cooperative relaying system.

The method and arrangement according to the invention have been described primarily with reference to a CDMA system. It should be noted that the method and arrangement equally well may be utilized also in systems utilizing other access technologies such as Orthogonal Frequency Division Multiplexing (OFDM).

While the invention has been described in connection with what is presently considered to be the most practical and preferred embodiments, it is to be understood that the invention is not to be limited to the disclosed embodiments, on the contrary, is intended to cover various modifications and equivalent arrangements as defined by the appended claims.

What is claimed is:

1. A method in a user equipment for transferring control information to a radio base station in a wireless communication network, wherein a plurality of common pilot channels are available between the user equipment and the radio base station, wherein the method comprises:
   defining a set of unique pilot sequences;
   assigning, by the user equipment, specific pilot sequences from the set of unique pilot sequences to specific common pilot channels of the plurality of common pilot channels, thereby forming a pilot sequence assignment pattern that represents the control information; and
   transmitting, by the user equipment to the radio base station, the assigned specific pilot sequences on the specific common pilot channels.

2. The method according to claim 1, wherein the assigning step includes using, by the user equipment, a list of predetermined relations between pilot sequence assignment patterns and specific control information to determine the pilot sequence assignment pattern that represents the control information.

3. The method according to claim 2, wherein the list of pre-determined relations is formed as a concordance list, shared between all radio base stations and user equipments in the wireless communication network, relating the pilot sequence assignment patterns to the specific control information.

4. The method according to claim 1, wherein the control information comprises a representation indicating a type of control information and an associated parameter value.

5. The method according to claim 1, wherein two specific common pilot channels are used to transmit the assigned specific pilot sequences.

6. The method according to claim 1, wherein the control information includes information about a current power or code allocation of the radio base station.

7. The method according to claim 1, wherein the wireless communication network is a Multiple-Input-Multiple-Output (MIMO)-based wireless network, and the plurality of common pilot channels relates to a plurality of transmit antennas provided by a MIMO configuration.

8. A method in a radio base station for receiving control information from a user equipment in a wireless communication network, wherein a plurality of common pilot channels are available between the radio base station and the user equipment, wherein the method comprises:
   defining a set of unique pilot sequences; and
   receiving, by the radio base station, specific pilot sequences from the set of unique pilot sequences transmitted by the user equipment on specific common pilot channels of the plurality of common pilot channels, thereby forming a pilot sequence assignment pattern that represents the control information.

9. The method according to claim 8, further comprising: using, by the radio base station, a list of pre-determined relations between pilot sequence assignment patterns and specific control information to determine the pilot sequence assignment pattern that represents the control information.

10. A radio base station for receiving control information from a user equipment in a wireless communication network, wherein a plurality of common pilot channels are available between the radio base station and the user equipment, wherein the radio base station comprises:
   a memory for storing a defined set of unique pilot sequences;
   a receiving circuit configured to receive specific pilot sequences from the defined set of unique pilot sequences transmitted by the user equipment on specific common pilot channels of the plurality of common pilot channels, thereby forming a pilot sequence assignment pattern that represents the control information; and
   a processing circuit configured to utilize a list of pre-determined relations between pilot sequence assignment patterns and specific control information to derive the control information transmitted from the user equipment.

11. The radio base station according to claim 10, wherein the list of pre-determined relations is stored in a pilot sequences pattern storage in a form of a concordance list, shared between all radio base stations and user equipments in the wireless communication network.

12. The radio base station according to claim 10, wherein the control information comprises a representation indicating a type of control information and an associated parameter value.

13. The radio base station according to claim 10, wherein the receiving circuit is further configured to use two specific common pilot channels to receive the specific pilot sequences, providing four uplink signaling bits.

14. A user equipment for transferring control information to a radio base station in a wireless communication network, wherein a plurality of common pilot channels are available between the user equipment and the radio base station, wherein the user equipment comprises:
   a memory for storing a defined set of unique pilot sequences;
   a processing circuit configured to assign specific pilot sequences from the defined set of unique pilot sequences to specific common pilot channels of the plurality of common pilot channels, thereby forming a pilot sequence assignment pattern representing the control information; and
   a transmitting circuit configured to transmit the assigned specific pilot sequences on the specific common pilot channels.

15. The user equipment according to claim 14, wherein a list of pre-determined relations is stored in a pilot sequences pattern storage in a form of a concordance list, shared between all radio base stations and user equipments in the wireless communication network.

16. The user equipment according to claim 14, wherein the control information comprises a representation indicating a type of control information and an associated parameter value.

17. The user equipment according to claim 14, wherein the transmitting circuit is configured to use two specific common pilot channels to transmit the specific pilot sequences, providing four uplink signaling bits.

* * * * *

UNITED STATES PATENT AND TRADEMARK OFFICE
CERTIFICATE OF CORRECTION

PATENT NO. : 10,298,373 B2
APPLICATION NO. : 15/711007
DATED : May 21, 2019
INVENTOR(S) : Wang et al.

It is certified that error appears in the above-identified patent and that said Letters Patent is hereby corrected as shown below:

In the Drawings

In Fig. 6, Sheet 6 of 6, for Step "610", in Line 1, delete "SNIR" and insert -- SINR --, therefor.

In the Specification

In Column 2, Line 42, delete "signal-to-interference-plus-ratio" and insert
-- signal-to-interference-plus-noise ratio --, therefor.

In Column 2, Line 65, delete "channel" and insert -- channel. --, therefor.

In Column 8, Line 10, delete "may by conveyed" and insert -- may be conveyed --, therefor.

In Column 9, Line 33, delete "to interpreted" and insert -- to interpret --, therefor.

In Column 9, Line 50, delete "BS 210" and insert -- BS 110 --, therefor.

In Column 11, Line 15, delete "feedbacks." and insert -- feedbacks --, therefor.

In Column 11, Line 31, delete "Thus." and insert -- Thus, --, therefor.

In Column 11, Line 32, delete "adjustments." and insert -- adjustments --, therefor.

Signed and Sealed this
Third Day of September, 2019

Andrei Iancu
*Director of the United States Patent and Trademark Office*